United States Patent [19]

Bassignani

[11] 4,174,058

[45] Nov. 13, 1979

[54] MATERIAL MEASURING AND DISPENSING DEVICE

[76] Inventor: Anthony L. Bassignani, 17 King St., Norfolk, Mass. 02056

[21] Appl. No.: 866,219

[22] Filed: Jan. 3, 1978

Related U.S. Application Data

[63] Continuation-in-part of Ser. No. 761,894, Jan. 24, 1977, Pat. No. 4,071,171.

[51] Int. Cl.² .............................................. G01F 11/40
[52] U.S. Cl. .................................... 222/438; 222/452
[58] Field of Search .............. 222/305, 181, 434, 439, 222/448, 452, 506, 438

[56] References Cited

U.S. PATENT DOCUMENTS

| | | | |
|---|---|---|---|
| 1,285,206 | 11/1918 | Johnson et al. | 222/448 |
| 2,742,201 | 4/1956 | Hartley | 222/452 X |
| 3,179,303 | 4/1965 | Dankoff et al. | 222/438 X |
| 3,207,371 | 9/1965 | Stone | 222/439 X |
| 3,341,088 | 9/1967 | Moynihan | 222/440 |
| 3,907,166 | 9/1975 | Bassignani | 222/42 |
| 4,006,842 | 2/1977 | Bassignani | 222/43 |

*Primary Examiner*—Stanley H. Tollberg
*Attorney, Agent, or Firm*—Edgar H. Kent

[57] ABSTRACT

A measuring and dispensing closure member for a container of granulated material has a variable capacity dispensing mechanism, oppositely pivotable barrier members for alternately opening an inlet to the dispensing mechanism after closing its outlet and closing the inlet before opening the outlet, barrier operating mechanism including an operating member having a generally rectilinear path of operating motion inwardly and outwardly of the closure member and contained in an area of the closure member having a cross-section suitable for grasping in one hand, the operating member being accessible for operation by the thumb or a finger of such hand, and adjustment mechanism for varying the capacity of the dispensing mechanism from the exterior of the closure member.

8 Claims, 10 Drawing Figures

MATERIAL MEASURING AND DISPENSING DEVICE

CROSS-REFERENCE TO RELATED APPLICATION

This application is a continuation-in-part of my U.S. patent application SER. No. 761,894 filed Jan. 24, 1977, now Pat. No. 4,071,171.

BACKGROUND OF THE INVENTION

1. Field of the Invention

This invention relates to devices for measuring and dispensing granular materials. Particularly, the invention relates to such devices which are suitable for hand-held dispensing and which are provided with means for adjustably varying the quantity dispensed.

2. Description of the Prior Art

U.S. Pat. No. 3,179,303 discloses a device of the type concerned wherein a container closure houses the measuring and dispensing mechanism which includes a single, adjustable volume measuring compartment and parts rotatable about the closure axis for alternately exposing a first end of the compartment to the container contents for filling while closing its opposite end, and then reversely closing the first end and opening the other for dispensing. The rotating parts are spring-suspended in assembled relation to the closure, and the rotating parts are operated to fill and dispense positions by spring opposed and assisted opposite pivoting of an external lever circumferentially of the closure about its axis.

My aforesaid patent application discloses an improvement over the device disclosed in the patent, wherein the rotating parts are maintained in fixed relation longitudinally of the closure axis, thereby overcoming product leakage and operational problems with the spring suspension system of the patent structure, and rotation of the parts for fill and dispense operations is by relative rotation of the container and a rotary collar on the closure, providing much easier hand-held operation than the circumferentially pivoting lever of the device of the patent.

The device shown in my aforesaid patent application is designed for holding in both hands and operating by relative twisting of the hands, which is ideal in most cases. However, particularly when light materials such as dried cream, sugarfree sweeteners, instant coffee and the like are to be dispensed, a device that can be both held in and operated by a single hand may be preferable to some users. While my U.S. Pat. No. 4,006,842 shows a measuring and dispensing device provided with a handle and operating linkage available to a hand holding the device by the handle, the present invention contemplates a device of smaller size which is held by a hand gripping the body itself, rather than a handle such as with the device of my aforesaid patent application.

SUMMARY OF THE INVENTION

Accordingly, it is an object of this invention to provide a modification of the device shown in my aforesaid patent application to enable its operation by one hand holding the device by its body, more specifically by the thumb or one finger of such hand.

Another object is to provide such a modification without loss of the advantages of the device over the prior art, and without materially increasing its cost.

In attaining these objects, the invention provides a closure member for a container of granulated material to be dispensed having variable capacity dispensing means with an inlet end arranged for exposure to the container outlet and an outlet end; barrier members oppositely pivotable about an axis for alternately closing one of these ends while opening the other; and adjustment means for varying the capacity of the dispensing means; all similar to those disclosed in my aforesaid patent application. However, the operating means for oppositely pivoting the barrier members is different, and includes an operating member accessible from the exterior of the closure member, located in an area thereof having a cross-section of a size and shape suitable for grasping in one hand, for operation by a thumb or finger of that hand. The operating portion of the operating member has a generally rectilinear path of movement inwardly and outwardly of the closure member.

Preferably, spring means associated with the operating means opposes inward movement of the operating member and acts to return such member to outward position upon release of pressure thereon. Preferably, also, the path of operating movement of the operating member is substantially radial to the longitudinal axis of the closure member to facilitate operation by a simple squeeze of the hand holding the device with a thumb or finger on the operating member.

In preferred embodiments, the operating member includes a rotary gear connected to rotate the barrier members and a ratchet connected between the operating member and the gear, and the closure member includes attachment means rotatably attaching said barrier members to said closure member in fixed axial relation thereto and in fixed angular and axial relation to each other.

Normally, containers are provided for use with the closure members. However, since all the mechanism is contained in the closure members, it can be used with any container which it is made or adapted to fit.

DESCRIPTION OF THE PREFERRED EMBODIMENT

Figure 1:
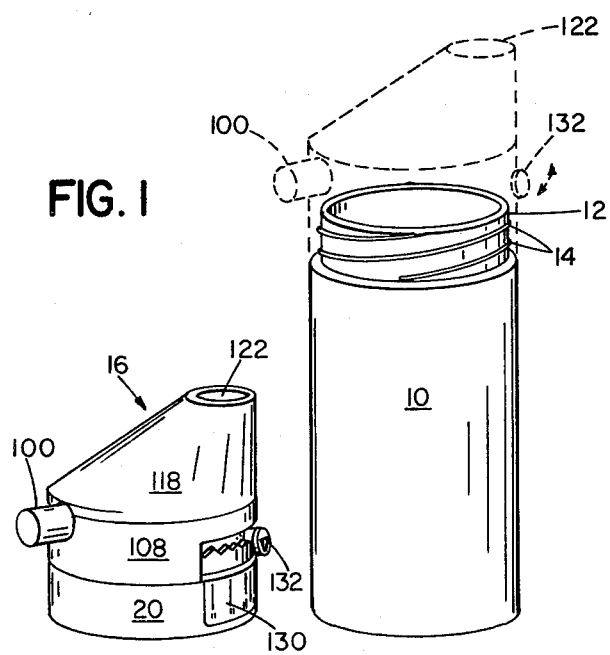
FIG. 1 is a side elevation view of a preferred embodiment, with closure member shown in full lines separated from the container and in dash lines applied thereto.
Figure 1A:
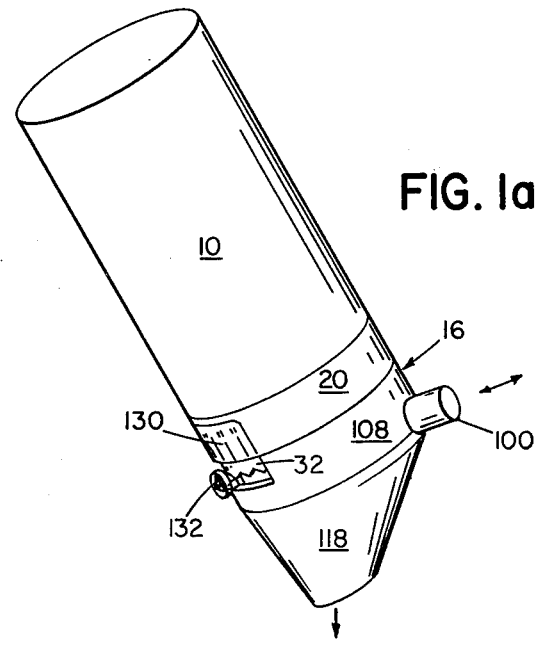
FIG. 1a is a view similar to FIG. 1 of the device of FIG. 1 with the closure member attached to the container and with the device in the inverted, use position.
Figure 2:
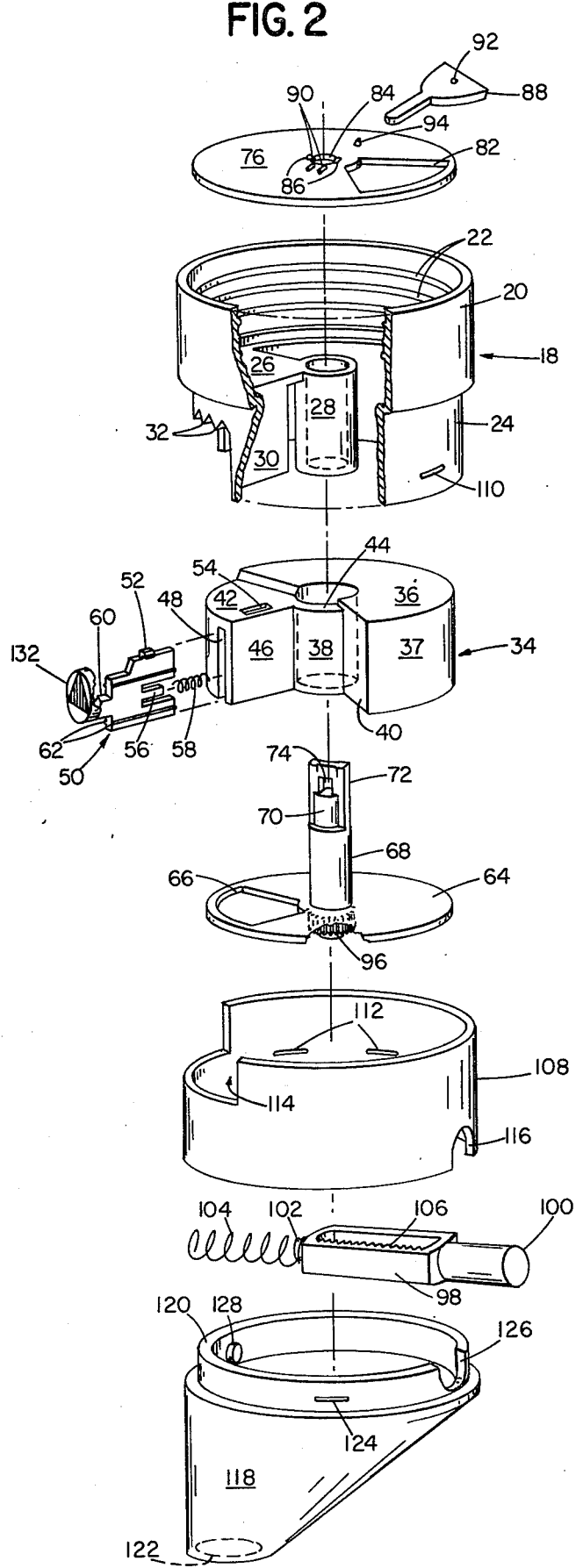
FIG. 2 is an exploded, perspective view of the parts of the closure member of the device in the position of FIG. 1a, broken away in part to show interior construction.

Referring first to FIGS. 1, 1a and 2, the preferred embodiment shown has a container 10, which may be cylindrical as shown, and is of size to be readily grasped and held in one hand (e.g., a cylinder of the order of 3-4 inches in diameter or less). Container 10 is provided with a reduced extension 12 at one end, the top end when the device is in the upright position shown in FIG. 1, the interior of which provides an opening into the container for filling it with the material to be dispensed and for discharging the material therefrom for dispensing. Extension 12 is provided with means for attaching a closure member thereto, which, as shown, is an external screw thread 14.

The closure member assembly designated generally 16 has a fixed member designated generally 18, which is fixed in the sense that it is fixedly attached to container 10. Member 18 is of hollow cylindrical form with an end portion 20 which is of a diameter to fit over extension 12 and has on its inner surface a screw thread groove 22 which mates thread 14 to attach member 18 and the closure assembly 16 fixedly to container 10. End portion 20 has a reduced diameter portion 24, the inner surface of which closely surrounds part of the relatively pivotable assembly hereinafter described. Portion 24 is provided with a flat internal projection 26 which supports a hollow stub shaft 28 located coaxially with the common axis of the container and closure member when these parts are assembled. Extension 26 has a depending wall 30 which forms one wall of the dispensing compartment when the closure member parts are assembled as hereinafter described, so that the dispensing compartment is fixed relative to the container when the closure member is attached thereto. Portion 24 is cut away beneath projection 26, the upper edge of the cutaway portion being provided with ratchet teeth 32 which cooperate with a pawl on the dispensing volume adjustment member hereinafter described.

A dispensing compartment volume or capacity adjusting member designated generally 34 has a partially circular disc-like top 36 and a partially cylindrical side wall 37 which fits rotatably within the inner wall of extension 24 of member 18, and a central hollow stub shaft 38 which fits rotatably over shaft 28. Top 36 has an axially depending wall 40, also attached to shaft 38 and side wall 37, which forms the adjustable wall of the dispensing compartment when the parts are assembled. A portion 42 of top 36 and a contiguous portion 44 of shaft 38 are of reduced axial height so that they will fit pivotably below extension 26 of member 18 when the parts are assembled. Portion 42 is provided with a depending wall 46, also connected to shaft 38, which is immediately behind wall 30 at the maximum adjustable volume of the dispensing compartment formed by walls 30 and 40 permitted by ratchet teeth 32. Depending walls 45 and 47 add strength (see also FIG. 8).

Figure 9:
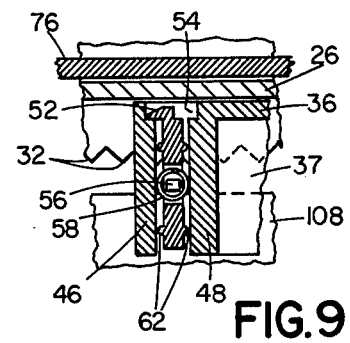
FIG. 9 is a vertical cross-section view on lines 9—9 of FIG. 7, looking in the direction of the arrows.

A wall 48 depending from top portion 42, on the side of wall 46 away from wall 40, defines with wall 46, portion 42 and shaft 38 a slot open at its outer end and bottom which receives the shank of a dispensing compartment volume adjustment control pin designated generally 50. The shank of pin 50 is provided with a resilient, generally L-shaped lug 52 which can be forced through a slot 54 in portion 42 of top 36, parallel to the slot between walls 48 and 46, when the shank is inserted in the latter slot which it is sized to fit. Lug 52 fits slidably over the edge of slot 54 when inserted therethrough to hold the pin 50 assembled (see FIG. 9). The shank of pin 50 also has a central end cavity with a rod 56 projecting from the base thereof which receives one end of a coil spring 58 which is compressed against shaft 38 when the pin is in operative position. The shank of pin 50 is also provided at its front with a double stepped portion the outer end of which is provided with a tooth or pawl 60 cooperating with ratchet teeth 32 when the parts are assembled (see FIG. 7), and with longitudinal resilient ribs 62 which facilitates sliding of the shank between walls 46 and 48.

The pivotable barrier member assembly for alternately closing and opening the ends of the dispensing compartment for filling and dispensing comprises a disc-like barrier member 64 having a diameter such as to fit rotatably within portion 24 of member 18. Barrier member 64 closes the axial opening through wall portion 24 except for a cut-away portion forming an opening 66 which, at one position of member 64, functions as a dispensing outlet from the dispensing compartment. Extending centrally from one face of member 64 and fixed thereto is a stub shaft 68 having a reduced end portion 70 to which are fixed the two legs of a flat U-shaped member 72 forming an axial extension of the shaft and providing an opening 74 between its base and the end of reduced portion 70 of shaft 68. Shaft 68 has a diameter to fit snugly but rotatably the internal bore of shaft 28 of member 18, and has a length such that, when fully extended through shaft 28, the reduced portion 70 and member 72 thereon project beyond the shaft 28.

Figure 3:
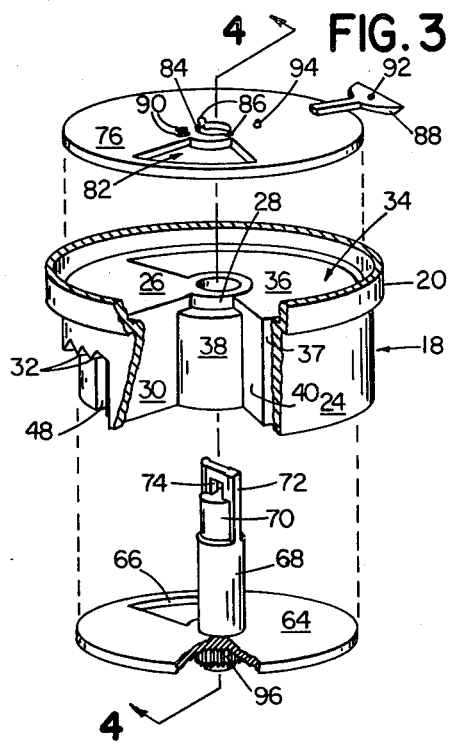
FIG. 3 is a view similar to FIG. 2 of parts shown in FIG. 2 in a different relative position.
Figure 5:
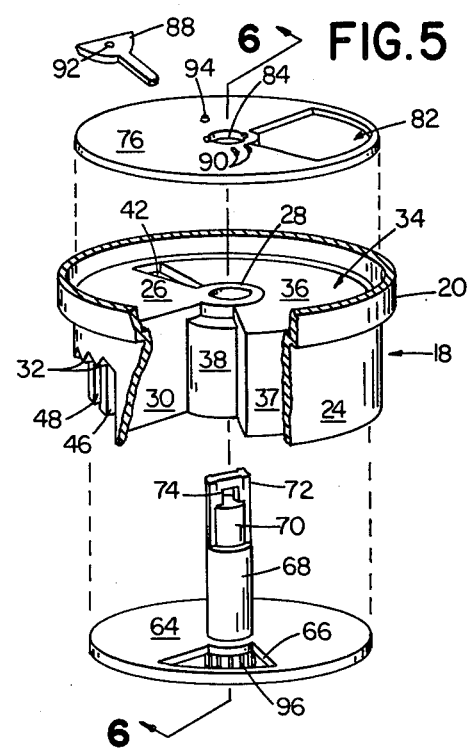
FIG. 5 is a view similar to FIG. 3 of the parts shown therein in a different relative position.
Figure 4:
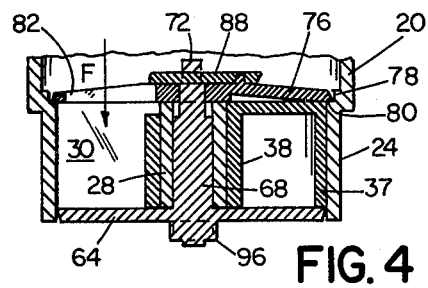
FIG. 4 is a vertical cross-section view of the parts shown in FIG. 3 assembled, taken on line 4—4 of FIG. 3 looking in the direction of the arrows.
Figure 6:
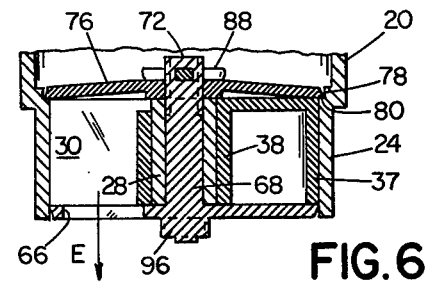
FIG. 6 is a vertical cross-section view of the parts shown in FIG. 5 assembled.

A second barrier member 76, similar to member 64 and shown at the upper end of FIGS. 2-6, is of a diameter to fit snugly, rotatably within an inwardly stepped portion 78 of wall portion 20 of member 18, and has a flat under edge which seats rotatably on the inner upper end 80 of wall portion 24 of member 18 when the parts are assembled (see FIGS. 4 and 6). The edge of member 76 is slightly beveled to reduce friction with stepped portion 78. Member 76 closes the axial opening through reduced end 12 of container 10 except for a cut-away portion defining an opening 82, which forms an inlet to the measuring compartment at one position of member 76. Opening 82, like opening 66, is within the periphery of the barrier member, having a thin outer rim at its outer end.

A central aperture 84 in member 76 receives therethrough reduced end 70 of shaft 68 with the legs of member 72 received in communicating opposite slots 86 in the periphery of aperture 84 to mount member 76 non-rotatably on shaft 68. With the member 76 so mounted, the stem of a resilient locking key 88 is inserted through opening 74 in member 72 between retaining ribs 90 on member 76 and a hole 92 in the shank of key 88 is forced over a pin 94 on member 76, thus releasably locking member 76 to shaft 68 in fixed radial and axial relation to shaft 68 in respect of the shaft axis.

In assembling the parts so far described, shaft 38 of dispensing compartment adjusting member 34 is telescoped over the free end of shaft 28, with wall 46 immediately behind wall 30 of member 18 and control pin 50 assembled into slot 48. Shaft 68 of barrier member 64 is inserted through shaft 28 until member 64 seats against the end of member 34 and opening 66 in member 64 registers with the measuring compartment between fixed wall 30 of member 18 and movable wall 40 of member 34. The opening 84 in member 76 is now inserted over the end of shaft 68 with the ends of member 72 received in slots 86, and key 88 is inserted through opening 74 and locked in place by ribs 90 and pin 94. With opening 66 in member 64 in registry with the measuring compartment, shaft 68 has approximately the angular position shown in FIG. 5, and the member 76 is applied in the one of the two possible positions in which its opening 82 is spaced less than 180° counterclockwise from the measuring compartment as shown in FIG. 5. By making one end of member 72 and its receiving slot 86 larger than the other, such positioning can be assured.

The parts are now assembled in the position of FIG. 6, the discharge position in which opening 66 is in registry with the measuring compartment. Shaft 68 may be rotated, in the clockwise direction in FIG. 6, to bring the opening 82 of barrier member 76 into registry with the measuring compartment, the fill position shown in FIG. 4, member 76 keeping the adjacent end of the compartment closed until opening 66 in member 64 is moved beyond the compartment so that member 66 closes the opposite end.

As shown in FIGS. 4 and 6, member 76 is slightly dished, upwardly in the drawings, from its periphery toward its center and is provided with a thickened hub portion which rides rotatably on the end of shaft 38, reducing friction between member 76 and member 36.

The operating mechanism for reciprocally pivoting the barrier members between the fill and discharge positions with relation to the measuring compartment comprises a toothed gear 96 secured to barrier member 64 on the opposite side thereof from shaft 68 and coaxial therewith. A rack 98 for operating gear 96 is of hollow rectangular shape with the width of its opening approximately equal to the diameter of gear 96, and has an operating stem 100 at one end and a boss 102 at the other end over which is received one end of a coil spring 104 (FIG. 2). Rack 98 has teeth 106 on the inside face of one only of its long sides, the side toward the viewer in FIG. 2, so that when the rack is fitted over gear 96 with teeth 104 meshed with the gear teeth, gear 96 and the barrier member assembly are rotated clockwise by moving the rack from right to left in FIG. 2 and counterclockwise for the reverse movement of the rack.

For retaining the rack assembled to the gear there is provided a two part assembly, one part of which is an annular collar 108, having an inner diameter such as to fit snugly over wall portion 24 of member 18, with one end thereof abutting the end of wall portion 24. Lugs 110 on wall portion 24 engage in depressions 112 on the inner wall of collar 108 to hold the collar demountably, fixedly on wall portion 24. A cut away area 114 in the abutted end of collar 108 is registered with, and provides space for the adjustment movement along teeth 32 of, the measuring compartment adjustment assembly 50. Collar 108 has sufficient axial length to project beyond the end of wall portion 24, and such projecting portion has a slot 116 with a semicircular end extending inwardly from its edge, the slot width and end radius being such as to fit loosely over actuating stem 100 of the ratchet 98.

The other part of the retainer assembly is a funnel 118 having a base diameter equal to that of collar 108. An upstanding annular lip 120, spaced slightly inwardly from the edge of the funnel base, defines the inlet to the funnel which, as shown, has an axis slanted to one side of the longitudinal axis of the device (shown by a dash line in FIG. 2), so that the funnel outlet 122 is at one side of that axis, although the funnel may be of regular frusto-conical configuration with the outlet centered on the device axis if desired. Lip 120 has a diameter such as to fit snugly within the end of collar 108, and may be provided with lugs 124 (FIG. 2) fitting corresponding depressions 125 in the inner wall of collar 108 (see FIGS. 2 and 7), although it is preferred to weld the two parts of this assembly together.

Lip 120 has a slot 126 with a semicircular end extending inwardly from its free end, conforming in size and shape to slot 116 in collar 108, so that when collar 108 and funnel 118 are assembled together, with slots 116 and 126 aligned, the semicircular ends of the slots form a circular opening into the interior of the assembly. Lip 120 is spaced inwardly from the periphery of the funnel base so that the periphery of the funnel forms a smooth continuation of the periphery of collar 108 when the two parts are assembled. A boss 128 on the inner wall of lip 120 diametrically opposite slot 116 receives thereover the end of spring 104 shown free in FIG. 2.

In assembling parts 108 and 118, rack 98 is first assembled to funnel 118, with one end of spring 104 surrounding boss 128 and its other end surrounding boss 102 and with stem 100 lying in the semicircular end of slot 126. Spring 104 is in its expanded mode, forcing stem 100 to its outermost position. Collar 108 is then applied over lip 120 with slot 116 in registry with slot 126 and, if lugs 124 and corresponding receiving depressions are not relied on to hold the parts together, lip 120 is welded, e.g. by sonic welding, or cemented, to the inner wall of collar 108.

In assembling the entire device, the collar 108 and funnel 118, assembled as just described, are applied to the remainder of the closure member, assembled as earlier described, by sliding collar 108 over wall portion 24 of member 18 with opening 114 aligned with teeth 32 therein until gear 96 slides into mesh with teeth 106 within rack 98, and lugs 110 snap into depressions 112. To complete the device, a suitably graduated scale 130 is fastened to wall portion 20 of member 18 opposite opening 114 in collar 108, which cooperates with a knob 132 applied to the end of pin assembly 50 and having a pointer to indicate the respective adjusted capacities of the measuring compartment at different positions of the pin assembly along teeth 32 corresponding to different rotated positions of the adjustment member 34 and different spacings of its wall 40 from the fixed wall 30 of the measuring compartment.

In operation, with the device upright as shown in FIG. 1, knob 132 is adjusted with reference to scale 130 to the desired capacity of the measuring compartment to be dispensed, if a change from the last previous setting is needed. This adjustment is normally made with the device upright, since that is easier and scale 130 is arranged to be read in the upright position. The device is now grasped in one hand about the closure member in the area of collar 108 with the thumb or a finger on the end of stem 100, and fingers or the thumb on the opposite side of the device axis. The device is inverted by twisting the wrist and a squeeze of the hand forces stem 100 inwardly toward the device axis, moving rack 98 in the direction to rotate gear 96 and the barrier member assembly counterclockwise from the discharge position of FIG. 4 to the fill position of FIG. 6. Filling takes place almost instantly as opening 82 comes into registry with the measuring compartment, whereupon release of pressure on stem 100 permits spring 104, compressed by the inward motion of stem 100, to return the parts to the normal, discharge position, emptying the measured content of the measuring compartment via funnel 118 to the food or receptacle over which the device is held.

While it is preferred to have the container and closure member of the same diameter as shown, this may be varied. The container may, for example, be of larger diameter, even too large to hold easily in one hand, so long as the closure member, at least in the area of the operating stem 100, is of sufficiently small cross-section for one-hand holding. Thus, a container of larger diameter than the container 10 shown could have a frusto-conical end leading to the threaded outlet portion for receiving a closure member of smaller, uniform diameter. Alternatively, collar 108 of the closure member could be made of smaller diameter, and the funnel 118 of smaller maximum diameter, than the remainder of the device, in entirety or by forming a flat or indented area of shortened distance from the device axis containing the slots 116, 126 for receiving the operating stem 100.

Use of a spring such as 104 for returning the operating parts to normal position is preferred but not essential. If a spring is not provided, stem 100 should have provision for two way operation by a thumb or finger, such as a curved member projecting from its end to fit over a thumb or finger. The rack and gear operating mechanism is simple to make and assemble, reliable and preferred, but other means for translating the rectilinear motion of stem 100 into rotary motion of the barrier members may be used, for example a slotted lever arm pivotably connecting the operating stem to the barrier member assembly.

One advantage of the device as shown is the ease with which the closure member may be disassembled for cleaning and then reassembled. Thus, the parts assembled to member 18 as shown in FIGS. 3 to 6 may be readily separated from the remainder as a unit and either cleaned as such or further disassembled for cleaning. Collar 108 and funnel 118 are preferably permanently fastened together, since their separation is not needed for cleaning then and the parts they contain.

Figure 7:
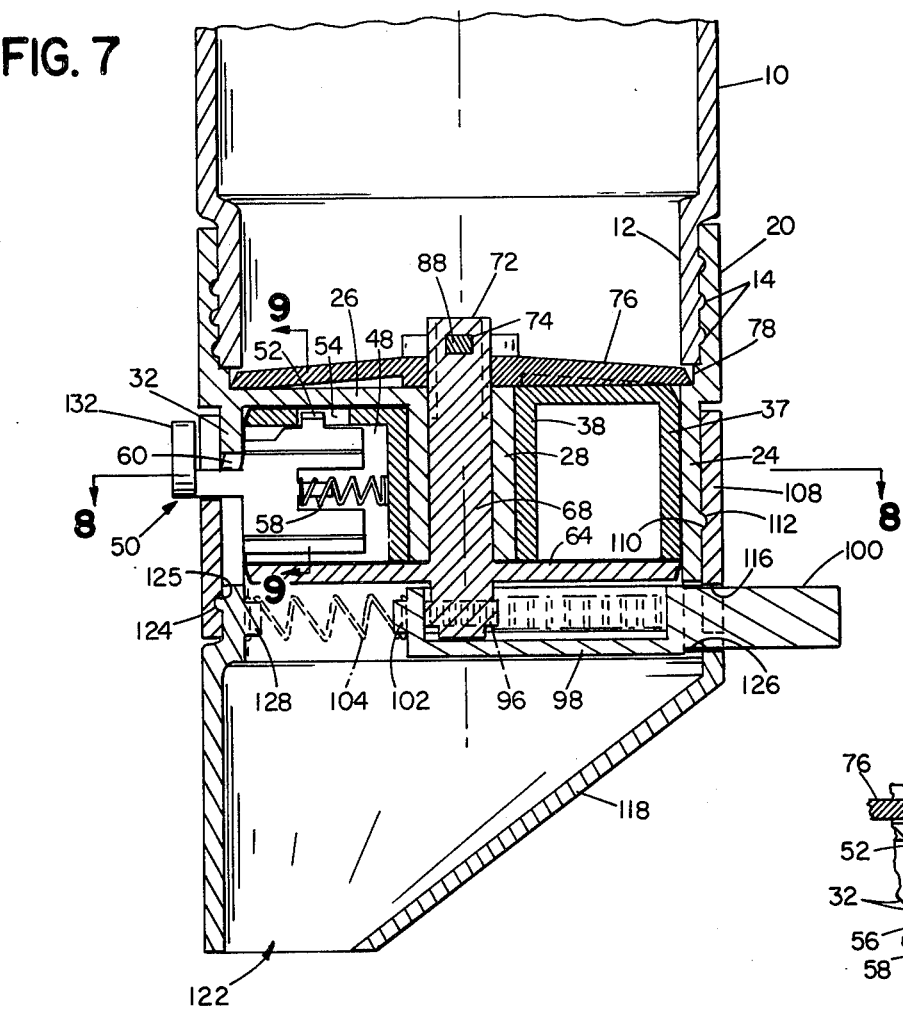
FIG. 7 is a vertical cross-section view of the lower portion of the device as shown in FIG. 1a, taken on line 7—7 of FIG. 8 looking in the direction of the arrows.
Figure 8:
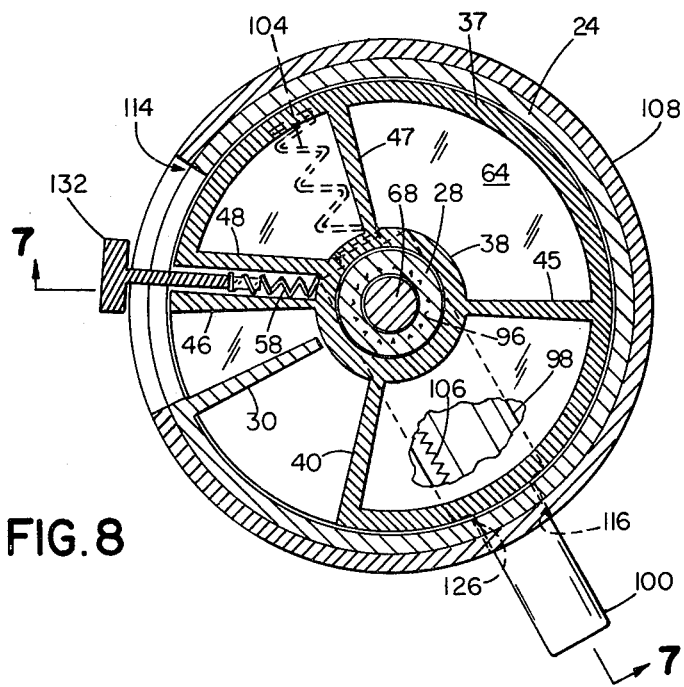
FIG. 8 is a transverse cross-section view on line 8—8 of FIG. 7, looking in the direction of the arrows.

In adjusting the volume or capacity of the dispensing compartment, pin 50 is pushed inwardly from its latched position of FIG. 7 by means of knob 132, lug 52 sliding in slot 54 until pawl tooth 60 clears the inside of ratchet teeth 32. Member 34 can now be pivoted by means of pin 50 and knob 132 to move wall 40 of member 34 toward or away from fixed wall 30 of member 18 the required amount, as indicated by the pointer on knob 132 cooperating with scale 130 on wall portion 20 (FIGS. 1 and 1a), scale 130 being normally graduated in fractions and multiples of a teaspoon and/or tablespoon. The pressure on knob 132 is then released so that pawl 60 engages the corresponding space between ratchet teeth 32. FIG. 8 shows the parts related in an intermediate adjustment between maximum and minimum, the maximum being when wall 46 is immediately adjacent wall 30.

I claim:

1. A closure member for attachment to an outlet from a container of granulated material for providing dispensing of the contents thereof in successive increments of variable volume, said closure member comprising:
   variable capacity dispensing means having an inlet end arranged for exposure to said container outlet and an outlet end;
   barrier members oppositely pivotable about an axis to alternately close said outlet end and thereafter open said inlet end to said container for filling, and to close said inlet end and thereafter open said outlet end for dispensing;
   operating means for oppositely pivoting said barrier members, including an operating member accessible from the exterior of said closure member,
   said closure member, at least in the area containing said operating member, having a cross-section of a size and shape suitable for grasping in one hand, and said operating member being accessible for operation by a thumb or finger of a hand grasping the closure member in said area and having a generally rectilinear path of opposite operating movement inwardly and outwardly of said closure member; and
   adjustment means accessible from the exterior of said closure member for adjustably varying the capacity of said dispensing means.

2. A closure member according to claim 1 which includes spring means associated with said operating means to resist said inward motion of said operating member and to return said operating member to outward position upon release of pressure thereon.

3. A closure member according to claim 1 wherein said operating means includes a rotary gear connected to rotate said barrier members and a ratchet connected between said operating member and said gear for oppositely pivoting said gear and said barrier members on opposite operating movements of said operating member.

4. A closure member according to claim 1 which includes attachment means rotatably attaching said barrier members to said closure member in fixed axial relation thereto.

5. A closure member according to claim 4 wherein said attachment means couples said barrier members together in fixed angular and axial relation to each other.

6. A closure member according to claim 5 wherein said attachment means includes a first shaft fixed to said closure member, a second shaft fixed axially to one of said barrier members, one of said shafts being hollow and sized to receive the other said shaft rotatably therein, and means for detachably coupling the other said barrier member to said second shaft and detachably coupling said shafts relatively rotatably together in fixed axial relation.

7. A closure member according to claim 1 wherein said dispensing means is a variable capacity, single dispensing compartment in fixed location relative to said container outlet.

8. A closure member according to claim 1 wherein said rectilinear path is substantially radial to the longitudinal axis of said closure member.

* * * * *